United States Patent
Konar (10) Patent No.: US 10,325,281 B2
(45) Date of Patent: Jun. 18, 2019

(54) EMBEDDED IN-SITU EVALUATION TOOL

(71) Applicant: Google LLC, Mountain View, CA (US)

(72) Inventor: Ellen Konar, Palo Alto, CA (US)

(73) Assignee: Google LLC, Mountain View, CA (US)

(*) Notice: Subject to any disclaimer, the term of this patent is extended or adjusted under 35 U.S.C. 154(b) by 304 days.

(21) Appl. No.: 15/438,098

(22) Filed: Feb. 21, 2017

(65) Prior Publication Data

US 2017/0200188 A1    Jul. 13, 2017

Related U.S. Application Data

(63) Continuation of application No. 12/253,759, filed on Oct. 17, 2008, now abandoned.

(60) Provisional application No. 60/980,725, filed on Oct. 17, 2007.

(51) Int. Cl.
   *G06Q 30/02*    (2012.01)
(52) U.S. Cl.
   CPC ......... *G06Q 30/0245* (2013.01); *G06Q 30/02* (2013.01); *G06Q 30/0242* (2013.01); *G06Q 30/0273* (2013.01); *G06Q 30/0275* (2013.01)
(58) Field of Classification Search
   CPC .................................................... G06Q 30/02
   See application file for complete search history.

(56) References Cited

U.S. PATENT DOCUMENTS

| | | | |
|---|---|---|---|
| 7,151,540 B2 | 12/2006 | Young | |
| 7,499,876 B2 | 3/2009 | Rupp et al. | |
| 7,778,872 B2 | 8/2010 | Kamangar et al. | |
| 8,015,073 B2 | 9/2011 | Ilechko et al. | |
| 9,058,307 B2* | 6/2015 | Tien | G06F 17/21 |
| 9,392,026 B2* | 7/2016 | Tien | H04L 65/00 |
| 2002/0042738 A1 | 4/2002 | Srinivasan et al. | |
| 2003/0191653 A1 | 10/2003 | Birnbaum et al. | |
| 2004/0186778 A1 | 9/2004 | Margiloff et al. | |
| 2004/0204238 A1 | 10/2004 | Aoki | |
| 2004/0204983 A1 | 10/2004 | Shen et al. | |
| 2005/0027587 A1 | 2/2005 | Latona et al. | |
| 2005/0223002 A1 | 10/2005 | Agarwal et al. | |
| 2006/0149614 A1 | 7/2006 | Suzuki et al. | |
| 2006/0229896 A1* | 10/2006 | Rosen | G06Q 10/10 705/321 |
| 2006/0277474 A1 | 12/2006 | Robarts et al. | |

(Continued)

OTHER PUBLICATIONS

International Preliminary Report on Patentability from International Application No. PCT/US2008/080360 dated Apr. 29, 2010, 6 pages.

(Continued)

*Primary Examiner* — Marilyn G Macasiano
(74) *Attorney, Agent, or Firm* — Fish & Richardson P.C.

(57) ABSTRACT

Methods, systems, and apparatus, including computer program products, in which contextual bids for an auction are provided for advertisement requests for presentation of an advertisement in an identified context. Each contextual bid is based on an effectiveness measure associated with a corresponding advertisement and the identified context. Each corresponding advertisement can be served in a plurality of contexts, and the corresponding advertisement has a corresponding plurality of effectiveness measures, each effectiveness measure determined from evaluation results received from evaluations conducted in the plurality of contexts.

20 Claims, 6 Drawing Sheets

(56) References Cited

U.S. PATENT DOCUMENTS

| | | |
|---|---|---|
| 2006/0294084 A1 | 12/2006 | Patel et al. |
| 2007/0083611 A1 | 4/2007 | Farago et al. |
| 2007/0233503 A1 | 10/2007 | Meyer et al. |
| 2008/0162273 A1* | 7/2008 | Nguyen ............. G06Q 10/0637 705/7.36 |
| 2008/0162329 A1 | 7/2008 | Knapp et al. |
| 2009/0276296 A1* | 11/2009 | Spriegel ................ G06Q 10/00 705/7.38 |
| 2017/0052532 A1* | 2/2017 | Adler ................ G05B 23/0283 |

OTHER PUBLICATIONS

International Search Report and Written Opinion from International Application No. PCT/US2008/080360 dated May 28, 2009, 11 pages.

* cited by examiner

EMBEDDED IN-SITU EVALUATION TOOL

CROSS-REFERENCE TO RELATED APPLICATIONS

This Application is a continuation of U.S. application Ser. No. 12/253,759, filed on Oct. 17, 2008, which claims the benefit U.S. Provisional Patent Application No. 60/980,725, filed on Oct. 17, 2007, the contents of each are incorporated herein by reference.

BACKGROUND

This document relates to measuring the effectiveness of online advertisements.

The rise of the Internet has enabled access to a wide variety of content items, e.g., video and/or audio files, web pages for particular subjects, and news articles. Such access to these content items has likewise enabled opportunities for targeted advertising. For example, content items can be identified to a user by a search engine in response to a query submitted by the user. One example search engine is the Google™ search engine provided by Google Inc. of Mountain View, Calif., U.S.A. The query can include one or more search terms, and the search engine can identify and, optionally, rank the content items based on the search terms in the query and present the content items to the user (e.g., according to the rank). The query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. As the users are likely interested in the particular content on the publisher webpage, they are also likely to be interested in the product or service featured in the advertisement. Accordingly, such targeted advertisement placement can help drive online customers to the advertiser's website.

The serving of the advertisements can be further optimized by evaluating the effectiveness of the advertisements. One technique for evaluating the effectiveness of an advertisement is to survey an audience for advertisement recognition and brand linkage. The measure of advertisement recognition can, for example, be based on the percentage of a survey audience that recognizes the advertisement, and the measure of brand linkage can, for example, be based on the percentage of the survey audience that correctly identifies the featured product and/or brand of the advertisement. An advertisement can be brand obfuscated, i.e., branding and/or product information can be removed from the advertisement, and an audience can be surveyed to measure the brand linkage and advertisement recognition.

Such surveys, however, are typically conducted after an advertising campaign has run. Additionally, such surveys are typically context-independent, i.e., the surveys do not measure how effective an advertisement may be in the various contexts in which the advertisement may be presented.

SUMMARY

In general, one aspect of the subject matter described in this specification can be embodied in methods that include the actions of generating an evaluation version of an advertisement, the evaluation version of the advertisement including an evaluation tool for collecting evaluation results; serving the evaluation version of the advertisement for presentation in each of a plurality of contexts; for each serving of the evaluation version of the advertisement: determining the context in which the evaluation version of the advertisement is presented; receiving advertisement evaluation results for an evaluation conducted using the evaluation tool; and associating the advertisement evaluation results with the context in which the evaluation version of the advertisement is presented; and generating engagement rates for the evaluation version of the advertisement and the advertisement, each engagement rate being associated with at least one corresponding context of the plurality of contexts, each engagement rate being a measure of a rate of audience participation in evaluating the advertisement for the corresponding context using the evaluation tool, and each engagement rate being determined independent of a performance rate of the advertisement. Other embodiments of this aspect include corresponding systems, apparatus, and computer program products.

Another aspect of the subject matter described in this specification can be embodied in methods that include the actions of generating evaluation versions of advertisements in an advertising campaign, each evaluation version including an evaluation tool for collecting evaluation results; serving the evaluation versions of the advertisements for presentation in each of a plurality of contexts; for each serving of an evaluation version of an advertisement, determining the context in which the evaluation version of the advertisement is presented; receiving advertisement evaluation results for an evaluation conducted using the evaluation tool; and generating engagement rates, each engagement rate being associated with an advertisement in the advertisement campaign and the corresponding evaluation version of the advertisement, and further associated with a corresponding context of the plurality of contexts, each engagement rate being a measure of a rate of participation in evaluating advertisement in the corresponding context, and each engagement rate being determined independently of performance rates of the advertisements. Other embodiments of this aspect include corresponding systems, apparatus, and computer program products.

Another aspect of the subject matter described in this specification can be embodied in methods that include the actions of receiving an advertisement request for presentation of an advertisement in an identified context, the identified context being one of a plurality of contexts; receiving auction bids for advertisements in response to the advertisement request, the auction bids including contextual bids, each contextual bid being based on one or more performance parameters for a corresponding advertisement and an effectiveness measure associated with the corresponding advertisement and the identified context; and selecting one or more advertisements based on the auction bids and serving the selected one or more advertisements in response to the advertisement request; wherein each corresponding advertisement can be served in a plurality of contexts, and each corresponding advertisement has a corresponding effectiveness measure for each of the plurality of contexts, each effectiveness measure determined from evaluation results received from evaluations conducted in the plurality of contexts. Other embodiments of this aspect include corresponding systems, apparatus, and computer program products.

Another aspect of the subject matter described in this specification can be embodied in methods that include the actions of identifying advertisements in an advertisement campaign; generating evaluation versions of the advertisements; serving the evaluation versions of the advertisements for presentation in a plurality of contexts; for each serving of an evaluation version of an advertisement: determining the context in which the evaluation version of the advertisement is presented; and determining whether a user selects the evaluation version of the advertisement in the context; receiving evaluation results for evaluation conducted from the evaluation version the advertisements; and generating an evaluation value for the advertisement for each of the plurality of contexts, the evaluation values including one or more of a brand linkage value, and advertisement likeability value, and an advertisement recognition value. Other embodiments of this aspect include corresponding systems, apparatus, and computer program products.

Another aspect of the subject matter described in this specification can be embodied in methods that include the actions of receiving an advertisement request for presentation of an advertisement in an identified context; receiving contextual bids for corresponding advertisements in response to the advertisement request, each contextual bid being based on one or more evaluation values associated with a corresponding advertisement and the identified context; and selecting one or more advertisements based on the contextual bids and serving the selected one or more advertisements in response to the advertisement request; wherein the corresponding advertisements each have a corresponding plurality of evaluation values for a corresponding plurality of contexts, each evaluation value determined from evaluation results received from evaluations conducted in the plurality of contexts; and the identified context is one of the plurality of contexts. Other embodiments of this aspect include corresponding systems, apparatus, and computer program products.

Various optional advantages and features can include the determination of engagement rates for many different contexts. Such engagement rates are a signal of how effective or ineffective the advertisement is in different contexts. The engagement rates can, in turn, be combined with other measurements obtained from evaluation results, such as brand linkage values, advertisement likeability values, and advertisement recognition values, to determine an advertisement effectiveness measure for each context. The engagement rate and/or advertisement effectiveness measure can be used, for example, to adjust an advertisement campaign or bidding parameters for an advertisement auction. Such adjustments can increase advertisement performance, and/or identify diminishing returns or negative impact due to overexposure of an advertisement. Additional features can include an in situ evaluation that is conducted without redirection or invasive pop-ups, and scalability of the evaluation from a single advertisement to an entire campaign.

For example, consider evaluation versions of advertisements for Brand X baseball equipment may have a very high engagement rate on college sports related web sites, and a very low engagement rate on professional sports related websites. The advertiser, e.g., Brand X Company, may determine that instead of a 50/50 split between professional and college advertisement placement, a better campaign strategy might be a 10/90 split between professional and college advertisement placement, as the viewers on the college sports related websites are much more responsive. Additionally, if Brand X Company decides to place the advertisement on professional sports related web sites, Brand X Company can be required to offer a higher minimum bid than required for the college sports related web sites, as the advertisement is less effective in the context of professional sports.

These various optional advantages and features can be separately realized and need not present in any particular embodiment. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
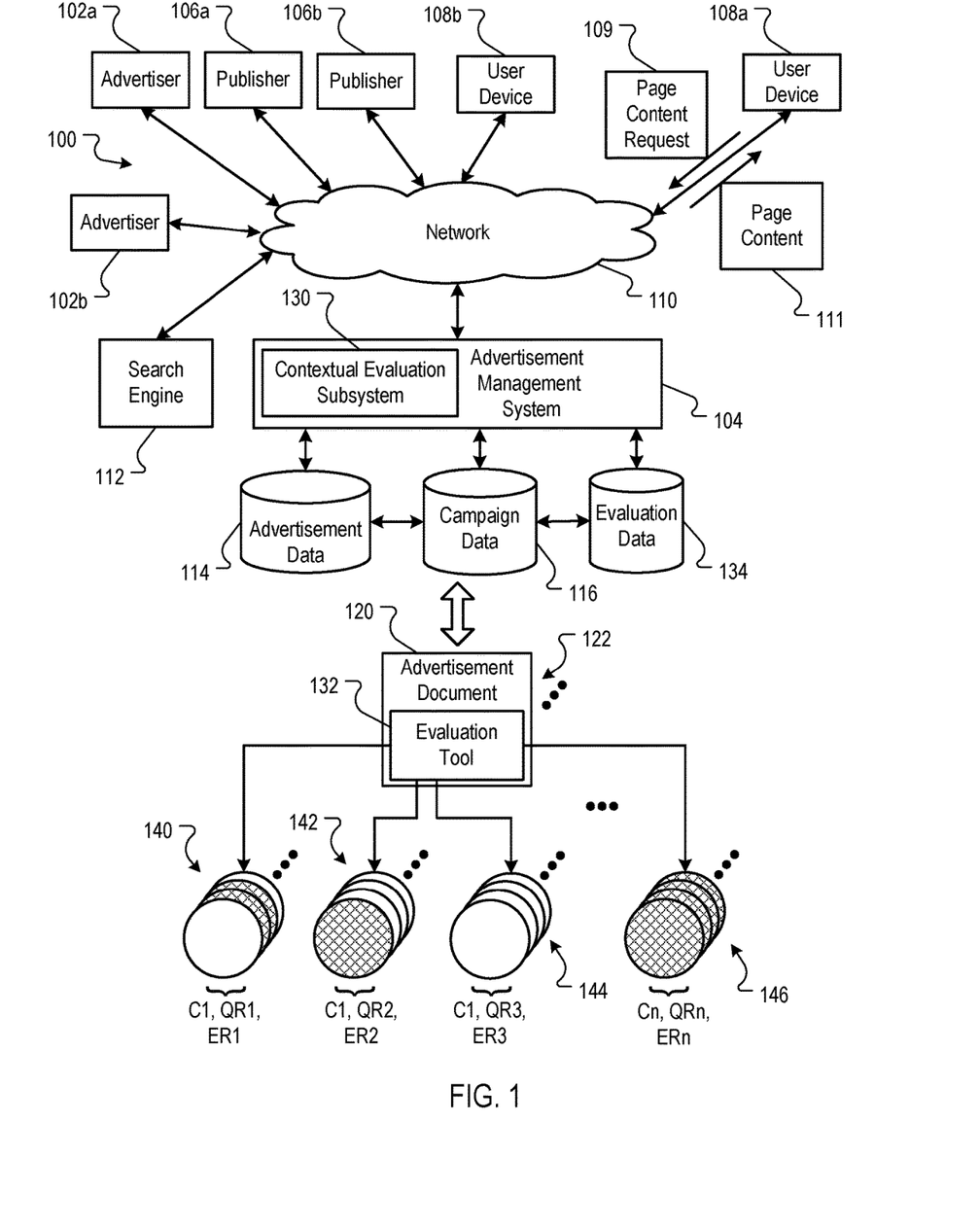
FIG. 1 is a block diagram of an example online environment.

FIG. 1 is a block diagram of an example online environment 100. The online environment 100 can facilitate the identification and serving of content items, e.g., web pages, or advertisements, to users. A computer network 110, such as a local area network (LAN), wide area network (WAN), the Internet, or a combination thereof, connects advertisers 102a and 102b, an advertisement management system 104, publishers 106a and 106b, user devices 108a and 108b, and a search engine 112. Although only two advertisers (102a and 102b), two publishers (102a and 102b) and two user devices (108a and 108b) are shown, the online environment 100 may include many thousands of advertisers, publishers and user devices.

§ 1.0 Advertisement Publishing and Tracking

In some implementations, one or more advertisers 102a and/or 102b can directly, or indirectly, enter, maintain, and track advertisement information in the advertising management system 104. The advertisements can be in the form of graphical advertisements, such as banner advertisements, text only advertisements, image advertisements, audio advertisements, video advertisements, or advertisements combining one of more of any of such components, or any other type of electronic advertisement document 120. The advertisements may also include embedded information, such as a links, meta-information, and/or machine executable instructions, such as HTML or JavaScript™.

A user device, such as user device 108*a*, can submit a page content request 109 to a publisher or the search engine 112. In some implementations, the page content 111 can be provided to the user device 108*a* in response to the request 109. The page content can include advertisements provided by the advertisement management system 104, or can include executable instructions, e.g., JavaScript™ instructions, that can be executed at the user device 108*a* to request advertisements from the advertisement management system 104. Example user devices 108 include personal computers, mobile communication devices, and television set-top boxes.

Advertisements can also be provided from the publishers 106. For example, one or more publishers 106*a* and/or 106*b* can submit advertisement requests for one or more advertisements to the system 104. The system 104 responds by sending the advertisements to the requesting publisher 106*a* or 106*b* for placement on one or more of the publisher's web properties (e.g., websites and other network-distributed content). The advertisements can include embedded links to landing pages, e.g., pages on the advertisers' 102 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, and arts-music.), part or all of the content request, content age, content type (e.g., text, graphics, video, audio, and mixed media), and geo-location information.

In some implementations, a publisher 106 can combine the requested content with one or more of the advertisements provided by the system 104. This combined page content request 109 and advertisements can be sent to the user device 108 that requested the content (e.g., user device 108*a*) as page content 111 for presentation in a viewer (e.g., a web browser or other content display system). The publisher 106 can transmit information about the advertisements back to the advertisement management system 104, including information describing how, when, and/or where the advertisements are to be rendered (e.g., in HTML or JavaScript™).

Publishers 106*a* and 106*b* can include general content servers that receive requests for content (e.g., articles, discussion threads, music, video, graphics, search results, web page listings, and information feeds), and retrieve the requested content in response to the request. For example, content servers related to news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, and the size and shape of the advertisements. The request for advertisements may also include the query (as entered, parsed, or expanded), information based on the query (such as geo-location information, whether the query came from an affiliate and an identifier of such an affiliate), and/or information associated with, or based on, the search results. Such information may include, for example, identifiers related to the search results (e.g., document identifiers), scores related to the search results (e.g., information retrieval ("IR") scores), snippets of text extracted from identified documents (e.g., web pages), full text of identified documents, and feature vectors of identified documents. In some implementations, IR scores can be computed from, for example, dot products of feature vectors corresponding to a query and a document, page rank scores, and/or combinations of IR scores and page rank scores.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and search results.

The advertisers 102, user devices 108, and/or the search engine 112 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), and conversion rate.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, or registering on a Website. Other actions that constitute a conversion can also be used.

§ 2.0 Advertisement Auctioning and Management

In addition to the advertisements being selected based on content such as a search query or web page content of a publisher, the advertisements can also be selected from an auction. In some implementations, the advertisement management system 104 includes an auction process. Advertisers 102 may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $1.00, and the maximum amount advertiser C will pay is $0.75.

The rank of an advertisement that is displayed can be determined by multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

A: Rank=quality score×maximum cost-per-click=3.0×$0.50=1.50

B: Rank=quality score×maximum cost-per-click=1.0×$0.75=0.75

C: Rank=quality score×maximum cost-per-click=1.0×$1.00=1.00

The advertisers can be ranked as follows:
1. A
2. C
3. B

An advertisement can also be associated with an actual cost-per-click. The actual cost-per-click of the advertisement can be determined by the maximum cost-per-click of the advertisement, quality score of the advertisement, and by the amount selected or bid by the advertiser directly below. In one implementation, the actual cost-per-click can be the price that is necessary to keep the advertisement's position above the next advertisement. To determine the actual cost-per-click, the system 104 can determine how much the advertiser in position 1 would have to pay to give them a rank equal to the advertiser in position 2, and then the system 104 adds a unit amount, e.g., $0.01, to this determined amount.

To determine how much the advertiser in position 1 would have to pay to give them a rank equal to the advertiser in position 2, the rank of position 2 can be divided by the quality score of position 1 and $0.01 can be added to that amount. The last advertiser in the list can pay a minimum cost-per-click to hold the position in the list. For example, suppose the minimum cost-per-click is $0.20. The actual cost-per-click of advertisers A, B, and C can be determined as follows:

A: C's rank/A's quality score=1.0/3=$0.33+$0.01=$0.34
C: B's rank/C's quality score=0.75/1=$0.75+$0.01=$0.76
B: minimum cost-per-click=$0.20

In this example, advertiser A would only have to pay $0.34 to hold the first position in the list of advertisements. C would have to pay $0.76 to hold the second position. Advertiser B would be required to pay the minimum cost-per-click amount of $0.20.

The advertisements, associated usage data, and bidding parameters described above can be stored as advertisement data in an advertisement data store 114. An advertiser 102 can further manage the serving of advertisement by specifying an advertising campaign. The advertising campaign can be stored in campaign data in a campaign data store 116, which can, for example, specify advertising budgets for advertisements, when, where and under what conditions particular advertisements may be served for presentation. For example, a computer company may design an advertising campaign for a new laptop computer that is scheduled to be released on November 20. The advertising campaign may have a budget of $500,000, and may have 30 different advertisements that are to be served for presentation during the month of November. Such data defining the advertisement campaign can be stored in the campaign data 116.

§ 3.0 Measuring Advertisement Effectiveness

As can be appreciated from the foregoing, the advertising management system 104 permits the serving of advertisements targeted to documents served by the publishers 106 and the search engine 112. Additionally, the usage information and quality factors described above can be used by the advertisement management system 104 to serve higher performing advertisements that are more likely to elicit a response from users of the user devices 108a and 108b.

The serving of the advertisements, such as the advertisement 120, can be further optimized by evaluating the effectiveness of the advertisements. One technique for evaluating the effectiveness of an advertisement is to have an audience, e.g., users of the user devices 108, evaluate the advertisement for advertisement recognition and brand linkage. The evaluation can be used to collect evaluation results that can be used to generate evaluation values that measure various advertisement features of advertisement effectiveness. For example, a measure of advertisement recognition can be based on the percentage of an evaluating audience that recognizes the advertisement, and the measure of brand linkage can, for example, be based on the percentage of the evaluating audience that correctly identifies the featured product and/or brand of the advertisement.

Such advertisement measurements alone are context-independent, i.e., the measurements of brand linkage and advertisement recognition alone do not reveal a measure of contextual effectiveness of an advertisement. Accordingly, in some implementations, the advertisement management system 104 includes a contextual evaluation subsystem 130. In addition to being able to collect evaluation results related to brand linkage, advertisement recognition, and other context-independent advertisement data, the contextual evaluation subsystem 130 can also measure how effective an advertisement is in the various contexts in which the advertisement may be presented. Such contexts can include, for example, content dependent contexts, time dependent contexts, visually dependent contexts, or other contexts.

An example of a content dependent context is a context defined by the publisher content in which the advertisement is presented. For example, an advertisement presented on a sports-related web page is presented in a sports context, and the same advertisement presented on a financial news-related web page is presented in a financial context. Such content contexts can, for example, be identified by meta-data related to the web page in which the advertisement is presented; by mining text of the web page to identify keywords associated with particular content types; or by identifying a predefined category to which the web page belongs. Other processes for identifying a content context can also be used.

Similarly, time dependent contexts can be defined by the local time of the user device 108 to which the advertisement is served, or defined by a reference to a standard time, such as Greenwich Mean Time (GMT). Likewise, visually dependent contexts can, for example be defined by a visual aspect of the advertisement, such as a different font sizes or styles; and different images. Other parameters or features that can define a context in which the advertisement is presented can be used.

Other example contexts can be a search context and a content context. The search context is a context in which the advertisement is presented in response to identification of a search query for which the advertisement is determined to be relevant. For example, advertisements presented in conjunction with search results from the search engine 112 are presented in the search context. The content context is a context in which the advertisement is presented in response to identification of publisher content for which the advertisement is determined to be relevant. For example, a sporting equipment advertisement that is deemed relevant to the content of a sports-related web site may be selected for presentation with a web page for the sports-related web site. Such a presentation with the web page is a presentation in the content context.

By measuring the contextual effectiveness of an advertisement, the advertiser can learn in which context the advertisement is most effective. Accordingly, advertisement placement, budgeting, and other advertising and/or campaign related factors can be adjusted to facilitate a more efficient use of the advertiser's resources.

In some implementations, the contextual evaluation subsystem 130 can generate an evaluation version 122 of the advertisement 120. The evaluation version 122 of the advertisement 120 can, for example, be generated by embedding an advertisement evaluation tool 132 in the advertisement 120. In some implementations, the advertisement evaluation tool 132 can be computer instructions, e.g., HTML, JavaScript™, or some other instructions executable by a computer device, such as a user device 108. In some implementations, the advertisement 120 can be brand obfuscated, i.e., a brand name or product identifier can be removed from the advertisement. For example, an advertisement image from a still advertisement or a key frame from a video advertisement can be used to generate a debranded version of the advertisement 120.

The advertisement 120 can be served for presentation in a plurality of contexts C1, C2, C3 . . . Cn in response to a corresponding plurality of advertisement requests. For example, as requests for advertisements are received from the publishers 102a and 102b, and/or the user devices 108a and 108b, and/or the search engine 112, the advertisement 120 may be served for presentation. In some implementations, the contextual evaluation subsystem 130 can serve the evaluation version 122 of the advertisement 120 in response to a subset of the advertisement requests, e.g., for every $n^{th}$ request, the advertisement management system 104 can serve the evaluation version 122 of the advertisement. Other selection processes can also be used to serve the evaluation version 122 of the advertisement 120, e.g., a random selection process, a contextual balancing process that proportionally serves the evaluation versions 122 according to contexts.

The contextual evaluation subsystem 130 can determine the context in which the evaluation version 122 of the advertisement 120 is presented. The determination can, for example, be made based on the content of a presentation environment, e.g., a sports web page, or news web page; or the determination can be made based on the web address of a requesting publisher; or by processing any other relevant information indicative of context in which the evaluation version 122 is presented.

The evaluation tool 132 can be presented to a user as a survey or some other assessment opportunity by which the user can evaluate the advertisement by use of the evaluation tool 132. In some implementations, the contextual evaluation subsystem 130 can determine whether a user selects the advertisement evaluation tool 132 presented in the context, and can receive advertisement evaluation results QR1, QR2, QR3 . . . QRn for evaluations conducted using the advertisement evaluation tool 132. For example, in the context C1, approximately 50% of the evaluation versions 122 of the advertisement 120 are selected for conducting an evaluation, as illustrated by unselected white impression circles and selected shaded impression circles. Likewise, approximately 25% of the evaluation versions 122 are selected in the context C2; almost none are selected in the context C3; and nearly all are selected in the context Cn. The corresponding evaluation results for the evaluations conducted can be provided to the advertising management system 104 and stored as the evaluation data 134.

For each context C1, C2, C3 . . . Cn, the contextual evaluation subsystem 130 can generate engagement rates for the evaluation version 122 and the advertisement 120. Each engagement rate ER1, ER2, ER3 . . . ERn is associated with the corresponding context C1, C2, C3 . . . Cn of the plurality of contexts. Each engagement rate ER1, ER2, ER3 . . . ERn is a measure of a rate of participation of use of the advertisement evaluation tool 132 for the corresponding context C1, C2, C3 . . . Cn.

Each engagement rate can be determined independently of a performance rate of the advertisement 120, e.g., the engagement rate can be determined independent of an overall click-through rate of the advertisement 120, or some other measure of performance of the advertisement when the advertisement is presented without the evaluation tool 132. In particular, each engagement rate ER is indicative of a level of user interaction with the advertisement evaluation tool 132 in a corresponding context C, which, in turn, is an indirect signal of an audience response to the advertisement 120.

The engagement rate signal, however, can either be a negative signal, e.g., audience dislike, or a positive signal, e.g., audience acceptance. In other words, the engagement rate alone may not necessarily indicate the effectiveness of the advertisement 120. For example, an evaluation version 122 of an advertisement 120 may have a particularly high engagement rate ER in a corresponding context C. However, the engagement rate ER may be particularly high in that context C because users in that context C may dislike the advertisement and desire to make their displeasure known to the advertiser. To determine an effectiveness of an advertisement 120, the engagement rate ER is combined with other data to generate advertisement effectiveness measures.

In some implementations, the engagement rates ER1, ER2, ER3 . . . ERn and the evaluation results QR1, QR2, QR3 . . . QRn can be used to generate the advertisement effectiveness measure for each of the contexts C1, C2, C3 . . . Cn. For example, if the advertisement evaluation tool 132 is used to evaluate advertisement recognition and brand linkage for the advertisement, then each advertisement effectiveness measure can be based on the advertisement recognition value, the brand linkage value, and the engagement rate ER associated with the context C. In one implementation, the evaluation values of advertisement recognition value, brand linkage value and engagement rates are percentage values, and each advertisement effectiveness measure can be a product of the three values, e.g., $$EM_x = AR * BL * ER_x$$

where AR is the percentage of the evaluating audience in all contexts C1, C2, C3 . . . Cn that recognized the advertisement, BL is the percentage of the evaluating audience in all contexts C1, C2, C3 . . . Cn that recognized the brand linkage, and ERx is the engagement rate of a particular context Cx.

In other implementations, the advertisement recognition values and the brand linkage values can be associated with each context, and each advertisement effectiveness measure can be a product of the three values for each context, e.g., $$EMx=ARx*BLx*ERx$$

where ARx is the percentage of the evaluating audience in a particular context Cx that recognized the advertisement, BLx is the percentage of the evaluating audience in a particular context that recognized the brand linkage, and ERx is the engagement rate of the particular context Cx.

In some implementations, an additional advertisement likeability value L can also be included. The likeability value L can be determined by qualitative evaluation results, e.g., a Likert scale of ratings of 1-5, with 1 indicative of a low degree of likeability and 5 indicative of a high degree of likeability, and the overall value normalized to 1. For example, the effectiveness measure for a context can be the product of four values, e.g., $$EMx=AR*BL*ERx*L$$

Or, alternatively:

$$EMx=ARx*BLx*ERx*Lx$$

where Lx is a likeability value for a particular context.

In other implementations, the effectiveness measure for a context can be determined independent of an engagement rate for the context. For example, an effectiveness measure for a context can be equal to the brand linkage value for that context.

By way of another example, the contextual evaluation subsystem 130 can determine advertisement effectiveness measures based on the number of evaluation questions answered for each evaluation, and based on other values instead of percentages. For example, the advertisement evaluation tool 132 may include hierarchal evaluation questions that are presented in response to receiving a response to a first hierarchal evaluation question or a previous hierarchal evaluation question, and the evaluation results can include data indicating a quantity of hierarchal evaluation questions presented, e.g., answered. The engagement rates ER1, ER2, ER3 . . . ERn for the advertisement can be generated by weighing each engagement rate ER according to the quantity of hierarchal evaluation questions presented in corresponding advertisement evaluations 132. For example, an advertisement evaluation may include six hierarchal questions, e.g., questions that are presented conditioned on an answer to a previously presented or first question. Each time an advertisement evaluation tool 132 is selected, an engagement count can be generated, e.g., a count value of 1. However, if only three of the six hierarchal questions are presented, the count value can be weighted by a factor of 1/2, e.g., 3/6. Likewise, if only two of the six hierarchal questions are presented, the count value can be weighted by a factor of 1/3, i.e., 2/6. Such a weighting can result in an engagement rate that is based on both an actual engagement of the evaluation tool 132 and a degree of engagement, i.e., questioning depth, of the evaluation tool 132. The weighted engagement rates can thus be used to generate the advertisement effectiveness measures as described above.

Thus, in some implementations, the contextual evaluation subsystem 130 can determine advertisement effectiveness measures based on qualitative data provided in the evaluation results. For example, the advertisement evaluation tool 132 may include questions that measure an audience's rating of the advertisement 120, e.g., "Rate this advertisement on a scale of 1-5 (1 being the worst rating, 5 being the best rating)."

Based on such qualitative evaluation results provided from the advertisement evaluation tool 132, the contextual evaluation subsystem 130 can generate an advertisement effectiveness measure for a particular context C. For example, a central tendency of the evaluation results can be determined, e.g., an average. An average value of three can be determined to be neutral and result in an effectiveness measure that is proportional to the engagement rate; an average value of less than three can be determined to be negative and result in an effectiveness measure that is a negative multiple of the engagement rate; and an average value greater than three can be determined to be positive and result in an effectiveness measure that is a positive multiple of the engagement rate. Other processes for generating an effectiveness measure based on qualitative data can also be used.

While the contextual evaluation subsystem 130 has been described with respect to an advertisement 120, the collection and processing of the evaluation data as described above can also be used to facilitate the tuning of an advertisement campaign. For example, the contextual evaluation subsystem 130 can identify advertisements in an advertisement campaign, and generate evaluation versions 122 of the advertisements, as indicated by the ellipses trailing the advertisement 120. Each evaluation version 122 of the advertisements 120 can be served as described above, and the evaluation results QR1, QR2, QR3 . . . QRn for each context C1, C2, C3 . . . Cn can likewise be processed for each evaluation version 122. Engagement rates ER1, ER2, ER3 . . . ERn the advertisement 120 in the advertisement campaign and the corresponding evaluation versions 122 can be generated in a similar manner as described above.

The engagement rates ER1, ER2, ER3 . . . ERn, evaluation results QR1, QR2, QR3 . . . QRn and the advertisement effectiveness measures can be stored in the evaluation data store 134. Additionally, the engagement rate and/or the advertisement effectiveness measure for each context C1, C2, C3 . . . Cn can be used to adjust advertisement placement, budgeting, and other advertising and/or campaign related factors to facilitate a more efficient use of the advertiser's resources. For example, a particular image associated with the advertisement 120 may be adjusted and the adjustment persisted to the advertisement data store 114. Likewise, an advertising budget, run rate, and/or placement parameters may be adjusted and persisted to the campaign data store 116.

§ 4.0 Example Advertisement Evaluation

In some implementations, the advertisement evaluation tool 132 can include computer instructions that generate an in situ evaluation. For example, the advertisement evaluation tool 132, upon execution by a user device 108, can generate the in situ evaluation substantially within the display region that would be normally occupied by the advertisement 120, i.e., the display region occupied by the evaluation version 122. The in situ evaluation is an evaluation having an evaluation environment substantially within the display area of the evaluation version 122 of the advertisement, i.e., engagement of the evaluation tool does not redirect a web browser to a separate evaluation landing page or open a new browser window directed to the evaluation landing page.

Figure 2A:
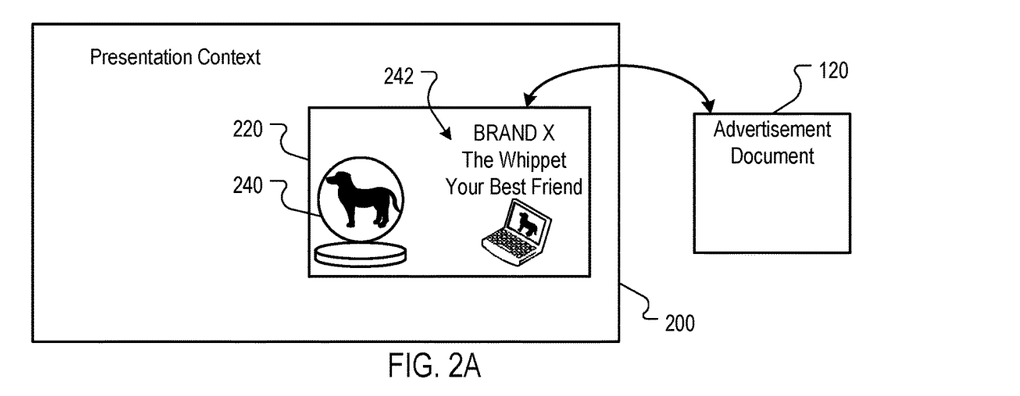
FIGS. 2A-2C are screen shots of an example evaluation being conducted for an online advertisement presented in a context.
Figure 2B:
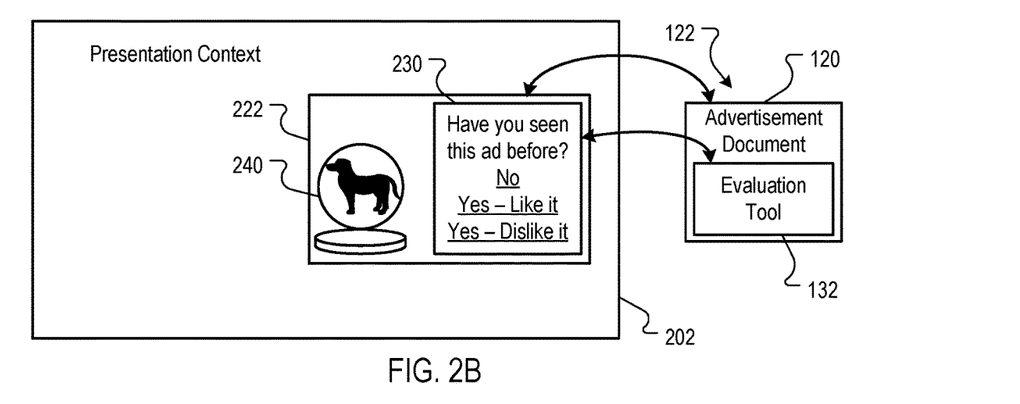
Figure 2C:
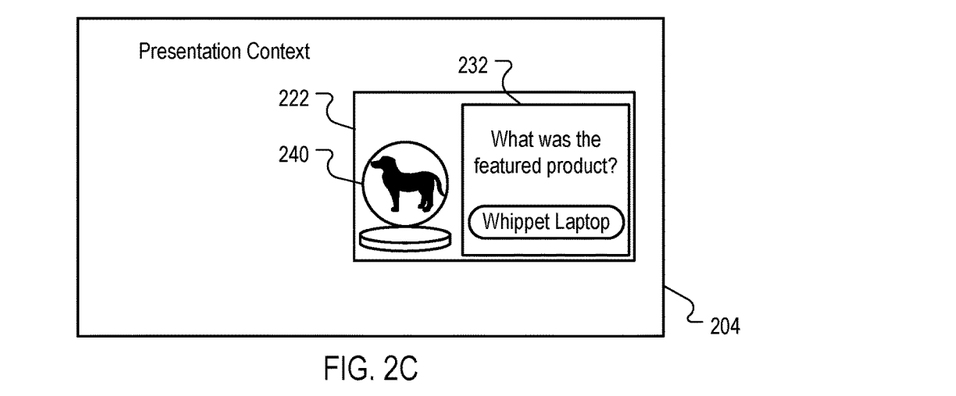

An example in situ evaluation is shown in FIGS. 2A-2C. FIGS. 2A-2C illustrates screen shots 200, 202 and 204 of an example evaluation being conducted for an online advertisement 220 presented in a context. FIG. 2A illustrates a displayed advertisement 220 being presented in a presentation context, e.g., either as an advertisement listed in response to a search query, or as an advertisement selected and displayed based on the content of an underlying web page, or based on some other context. The advertisement 220 can be displayed or otherwise presented on a computer device, such as a user device 108, in response to execution of the instructions included in the advertisement document 120.

The advertisement 220 includes a logo 240, and a branding 242 that includes a Brand name, "Brand X," a product name, "Whippet," a slogan, "Your Best Friend," and an image of the product.

FIG. 2B illustrates a screen shot 202 depicting a displayed evaluation version 222 of the advertisement 220. The evaluation version 220 can be displayed on a computer device, such as a user device 108, in response to execution of the instructions in the evaluation version 122 of the advertisement 120 and the advertisement evaluation tool 132 included in the evaluation version 122.

A first in situ evaluation environment 230 presents questions related to advertisement recognition and likeability. A user selection of "No" indicates a lack of advertisement recognition; conversely, a selection of one or "Yes—Like it" or "Yes—Dislike it" indicates both advertisement recognition and a corresponding likeability factor.

Other questions to measure likeability can also be used. For example, the questions can be directed to rating the advertisement, e.g., on a scale of 1-5, ratings of 1-5, with 1 indicative of a low degree of likeability and 5 indicative of a high degree of likeability; or presenting a broader range of "yes" responses, such as "Yes, and I love it!," "Yes, and it's okay," and "Yes, and I can't stand it!"

FIG. 2C illustrates a screen shot 204 depicting the displayed evaluation version 222 of the advertisement 220. A second in situ evaluation environment 232 presents a second hierarchal question in response to a user selection of one of the "Yes—Like it" or "Yes—Dislike it" options presented in FIG. 2B. The question presented in the may enter a product description. In some implementations, the second in situ display environment 232 is generated in response to engagement of the first in situ display environment 230.

Although only two questions are shown in FIGS. 2B and 2C, additional questions could also be presented during the evaluation. Additionally, while the evaluation shown in FIGS. 2B and 2C are in situ evaluations, other evaluation types could also be used, e.g., selection of the evaluation 230 can redirect a web browser to a separate evaluation landing page or open a new browser window directed to the evaluation landing page.

Figure 3:
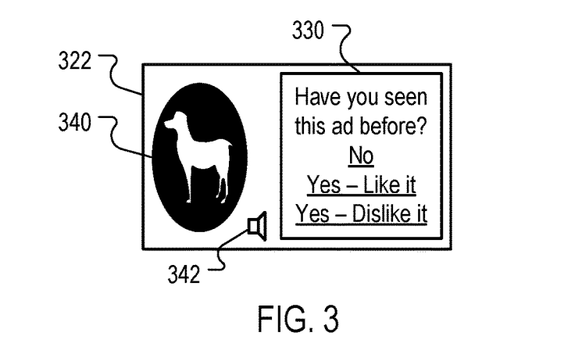
FIG. 3 is a screen shot of an example advertisement context defined by the context of the advertisement.

FIG. 3 is a screen shot 300 of an example advertisement context defined by the audio and/or visual features of the evaluation advertisement 322. For example, the advertisement context can be defined by presentation features of the evaluation advertisement 322 that includes a visual presentation feature or an audio presentation feature. For example, a different logo 340 can be used in the evaluation advertisement, and an audio feature 342, e.g., a barking sound, can also be included to evaluate the effectiveness of such features. Accordingly, the engagement rate of each presentation context, e.g., different audio and/or visual features, can be measured.

§ 5.0 Advertisement Effectiveness Based Auction

Figure 4:
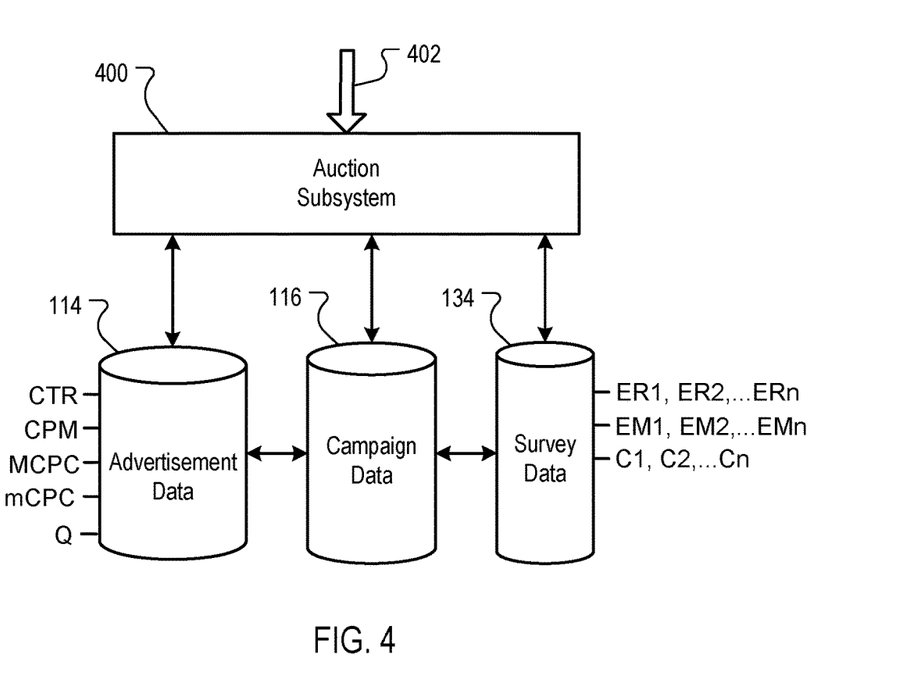
FIG. 4 is a block diagram of an auction subsystem that includes advertisement effectiveness measurements in a bidding process.

FIG. 4 is a block diagram of an auction subsystem 400 that uses advertisement effectiveness measurements EM1, EM2 . . . EMn in a bidding process. The auction subsystem 400 can be included in the advertisement management system 104 of FIG. 1.

In one implementation, the auction subsystem 400 processes advertiser bids for an amount the advertisers are willing to pay for each click of an advertisement, e.g., a cost-per-click amount an advertiser pays when, for example, a user clicks on an advertisement. The auction subsystem can take into account a number of performance parameters of an advertisement 120 stored in the advertisement data store 114, such as the click through rate (CTR), a cost per number of actions (CPM), a maximum cost per click (MCPC), a minimum cost per click (mCPC) and a quality factor (Q). Additional or fewer performance factors stored in the advertisement data store 114 can be used by the auction subsystem.

Additionally, campaign data stored in a campaign data store 116 can also be used by the auction subsystem 400 when performing an auction. Advertiser budgets, placements, and run rates can also be considered to ensure that an auction is conducted in a manner that is consistent with campaign strategies.

Finally, the engagement rates ER, effectiveness measures EM, and the contexts C of the advertisements that are submitted for auction can also be used when performing the auction. Together the performance parameters of an advertisement 120, the campaign data, and one or more of the engagement rates ER and effectiveness measures EM can be used to determine a contextual bid value for a bid.

For example, the auction subsystem 400 can receive an advertisement request 402 that includes context data defining a context in which an advertisement is to be displayed, e.g., content of a particular publisher, and/or defining a particular advertisement feature context, e.g., a video advertisement, or an image advertisement. In response to the request 402, the auction subsystem 400 can determine a corresponding engagement rate ER and a corresponding effectiveness measure EM for each advertisement in the auction and adjust advertiser bidding parameters accordingly.

For example, an advertisement that is determined to be very effective in the context defined by the advertisement request 402 may have a corresponding minimum cost per click reduced, as the advertisement has been determined to elicit a positive user experience in the context. Conversely, an advertisement that is determined to be very ineffective in the context defined by the advertisement request 402 may have a corresponding minimum cost per click increase, or may even be precluded from participating in the auction for the request 402, as the advertisement has been determined to elicit a negative user experience in the context, or likely to be ignored in the context and therefore generate no revenue for the publisher.

In some implementations, an adjusted minimum cost per click (mCPC') is determined according to the following formula:

$$mCPC' = (1-(EM/S))*mCPC$$

where EM is an advertisement effectiveness measure, S is a scaling factor, and mCPC is the minimum cost per click for an advertisement. Other auction adjustments based on the engagement rates, context, and effectiveness measures can also be used, e.g., mCPC'=mCPC/EM, or mCPC'=mCPC/EMn (where n can be an adjustable number), or mCPC'=ER*mCPC/log(EM). Such adjustments can be selected based on the ranges of the effectiveness measures and engagement rates.

In summary, the auction subsystem 400 can receive auction bids for corresponding advertisements in response to the advertisement request 402. One or more of the auction bids can be contextual bids. Each contextual bid is based on one or more performance parameters for a corresponding advertisement and an effectiveness measure EM associated with corresponding advertisement and a context specified by the request 402.

§ 6.0 Example Advertisement Effectiveness Processes

Figure 5:
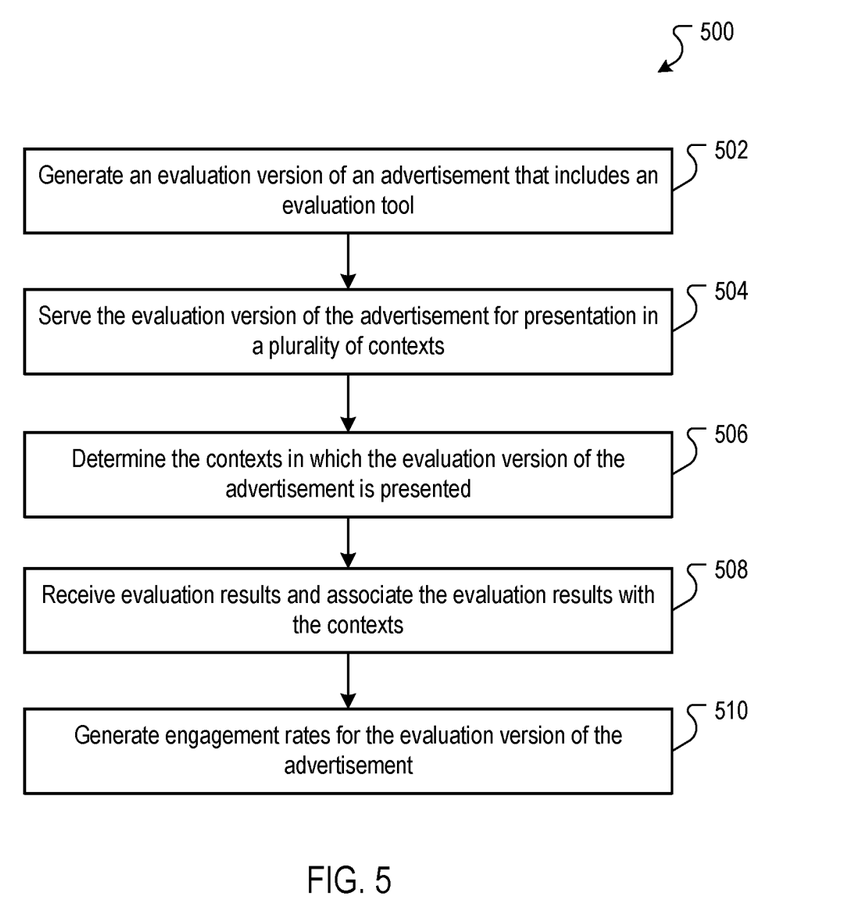
FIG. 5 is a flow diagram of an example process for determining advertisement engagement rates.

FIG. 5 is a flow diagram of an example process 500 for determining advertisement engagement rates. The process 500 can, for example, be implemented in the contextual evaluation subsystem 130 of FIG. 1, or in some other processing system.

An evaluation version of an advertisement that includes an evaluation tool is generated (502). For example, the contextual evaluation subsystem 130 can generate the evaluation version 122 of the advertisement 120.

The evaluation version of the advertisement is served for presentation in a plurality of contexts (504). For example, the contextual evaluation subsystem 130 can receive advertisement requests from publishers, user devices and search engines, and can serve the evaluation version 122 of the advertisement 120 for every $n^{th}$ impression.

For each serving of the evaluation version of the advertisement, the context in which the evaluation version of the advertisement is presented is determined (506). For example, the contextual evaluation subsystem 130 can determine the context in which the evaluation version 122 of the advertisement 120 is presented based on the advertisement request, or based on content associated with the requestor, or by processing other data that is indicative of a context.

Advertisement evaluation results are received and associated with the contexts (508). For example, the contextual evaluation subsystem 130 can receive evaluation results QR1, QR2, QR3 . . . QRn and associate them with the contexts C1, C2, C3 . . . Cn.

Engagement rates for the evaluation version of the advertisement are generated (510). For example, the contextual evaluation subsystem 130 can generate the engagement rates ER1, ER2, ER3 . . . ERn for corresponding contexts C1, C2, C3 . . . Cn as described with reference to FIG. 1 above.

Figure 6:
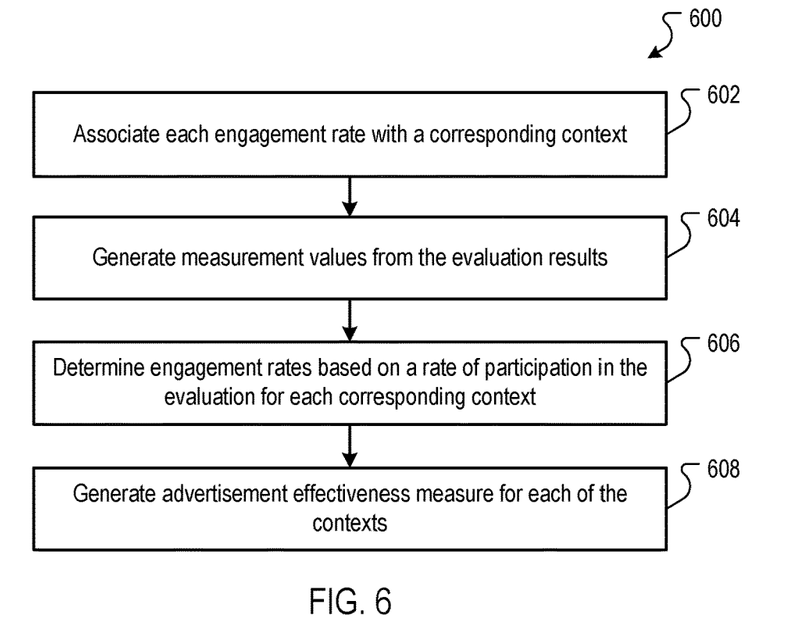
FIG. 6 is a flow diagram of an example process for generating advertisement effectiveness measurements.

FIG. 6 is a flow diagram of an example process 600 for generating advertisement effectiveness measurements. The process 600 can, for example, be implemented in the contextual evaluation subsystem 130 of FIG. 1, or in some other processing system.

Each engagement rate is associated with a corresponding context (602). For example, the contextual evaluation subsystem 130 can associate each engagement rate ER1, ER2, ER3 . . . ERn with a corresponding context C1, C2, C3, . . . Cn.

Measurement values are generated from the evaluation results (604). For example, the contextual evaluation subsystem 130 can generate measurement values, such as brand linkage (BL) values, advertisement recognition (AR) values, and other values based on the evaluation results.

Engagement rates based on a rate of participation in the evaluation using the evaluation tool for each corresponding context are determined (606). For example, the contextual evaluation subsystem 130 can determine an engagement rate for each context based on a ratio of the number of times the evaluation tool was used by a user to the number of times the evaluation version 122 of the advertisement 120 was served.

The engagement rate can be further determined based on the number of questions answered in the evaluation, or on other data indicative of a level of user engagement.

Advertisement effectiveness measures for each of the contexts are generated (608). For example, the contextual evaluation subsystem 130 generates an effectiveness measure EM for each context that is a product of the engagement rate ER for the context, the brand linkage value, and the advertisement recognition value.

The effectiveness measure EM can also be generated based on other data, such as qualitative data of the evaluation results. For example, the effectiveness measure can be generated based on the likeability of the advertisement, e.g., based on numeric ratings of the advertisement, with 1 being the lowest and 5 being the highest.

Figure 7:
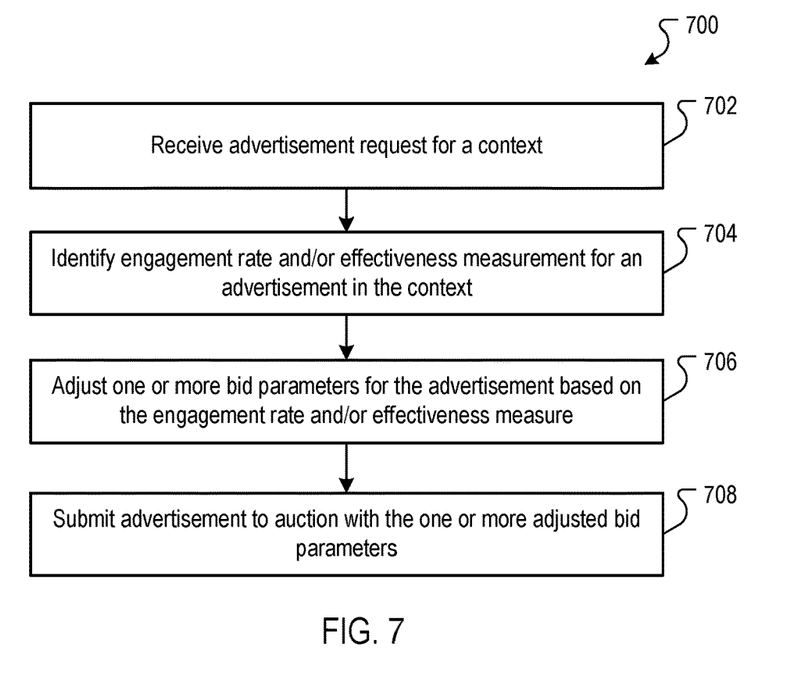
FIG. 7 is a flow diagram of an example process for adjusting advertisement bid parameters based on advertisement engagement rates and/or advertisement effectiveness measures.

FIG. 7 is a flow diagram of an example process 700 for adjusting advertisement bid parameters based on advertisement engagement rates and/or advertisement effectiveness measures. The process 700 can, for example, be implemented in the auction subsystem 400 of FIG. 4, or in some other processing system.

An advertisement request for a context is received (702). For example, the auction subsystem 400 can receive an advertisement request 402 that includes context data defining a context in which an advertisement is to be displayed, e.g., content of a particular publisher, and/or defining a particular advertisement feature context, e.g., a video advertisement or an image advertisement/

Engagement rates and/or effectiveness measures for the advertisement in the context are identified (704). For example, in response to the request 402, the auction subsystem 400 can identify a corresponding engagement rate ER and a corresponding effectiveness measure EM for each advertisement in the auction.

One or more bid parameters for the advertisement based on the engagement rate and/or the effectiveness measure are adjusted (706). For example, the auction subsystem 400 can reduce a minimum cost per click for an advertisement that is determined to be very effective in the context defined by the advertisement request 402, or can increase a corresponding minimum cost per click for an advertisement that is determined to be very ineffective in the context defined by the advertisement request 402.

The advertisement is submitted to auction with the adjusted one or more bid parameters (708). For example, the auction subsystem 400 can conduct the auction and use the adjusted auction parameters to select one or more winning advertisements in response to the advertisement request 402.

Figure 8:
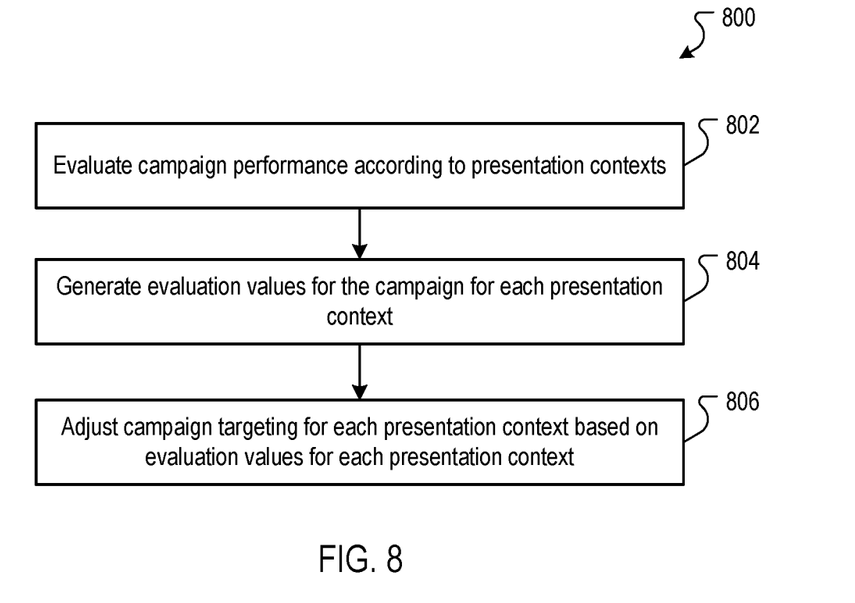
FIG. 8 is a flow diagram of an example process for adjusting campaign targeting based on contextual advertisement effectiveness measures.

FIG. 8 is a flow diagram of an example process 800 for adjusting campaign targeting based on contextual advertisement effectiveness measures. The process 800 can, for example, be implemented in the contextual evaluation subsystem 130 and the advertisement management system 104 of FIG. 1, or in some other processing system.

Campaign performance in each of a plurality of presentation contexts is evaluated (802). For example, the contextual evaluation subsystem 130 can serve evaluation versions of advertisements belonging to a campaign and evaluate the performance the advertisements in each of the contexts, such as described with reference to FIGS. 1-3, 5 and 6 above.

Evaluation values for the campaign for each presentation context are generated (804). For example, the contextual evaluation subsystem 130 can collect the evaluation results and generate corresponding evaluation values of brand linkage, likeability, and other evaluation values.

Campaign targeting for each presentation context based on the evaluation values for each presentation context is adjusted (806). For example, the advertisement management system 104 can adjust campaign targeting to increase advertisement serving in contexts having a low brand recognition and decrease serving of advertisements in contexts having high brand recognition if the goal of the campaign is to increase brand recognition. Likewise, the advertisement management system 104 can adjust campaign targeting to reduce the serving of advertisements for contexts in which the advertisements have a low likeability, and increase the serving of advertisements for contexts in which the advertisements have a high likeability. Other targeting adjustments based on the evaluation values can also be made.

The contextual evaluation subsystem 130 and the auction subsystem 400 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The contextual evaluation subsystem 130 and the auction subsystem 400 can be implemented separately, or can be implemented as a single software entity. The contextual evaluation subsystem 130 and the auction subsystem 400 can also be implemented in many computers communicating over a network, such as a server farm, or can be implemented in a single computer device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:
   embedding, within a portion of content that is presented in web pages, an in-situ evaluation tool that enables submission of feedback through the in-situ evaluation tool and without redirecting a client device to a different web page or causing a new browser window to be opened;
   distributing, to multiple different client devices that present various different web pages, the portion of content that includes the in-situ evaluation tool;
   collecting, from each client device among the multiple different client devices, first feedback obtained through interaction with a first interface of the in-situ evaluation tool when the portion of content is presented in a web page at the client device, wherein the first feedback is obtained without redirecting the client device to a different web page than the web page on which the portion of content is presented or causing a new browser window to be opened at the client device in response to the interaction with the first interface of the in-situ evaluation tool; and
   adjusting distribution of the portion of content based on the first feedback received from the multiple different client devices through the in-situ evaluation tool.

2. The method of claim 1, comprising:
   for each of a plurality of different presentation contexts in which the portion of content is distributed:
   generating, based on the first feedback received through the in-situ evaluation tool, recognition values for a given portion of content within the presentation context; and
   generating, based on the recognition values for the content within the presentation context, an effectiveness measure for the given portion of content within the presentation context.

3. The method of claim 2, wherein:
   generating the effectiveness measure for the given portion of content within the presentation context comprises generating an effectiveness measure that is proportional to a product of the recognition values for the given portion of content and an engagement rate indicated by the first feedback.

4. The method of claim 1, comprising:
   for each of a plurality of different presentation contexts in which the portion of content is distributed:
   generating, based on the first feedback received through the in-situ evaluation tool, linkage values for given portion of content within the presentation context; and
   generating, based on the linkage values for the given portion of content within the presentation context, an effectiveness measure for the given portion of content within the presentation context.

5. The method of claim 4, wherein:
   generating the effectiveness measure for the given portion of content within the presentation context comprises generating an effectiveness measure that is proportional to a product of the linkage values for the given portion of content and an engagement rate indicated by the first feedback.

6. The method of claim 1, comprising:
   for each of a plurality of different presentation contexts in which the given portion of content is distributed:
   generating, based on the first feedback received through the in-situ evaluation tool, content likability values for given portion of content within the presentation context; and
   generating, based on the content likability values for the given portion of content within the presentation context, an effectiveness measure for the given portion of content within the presentation context.

7. The method of claim 6, wherein:
   generating the effectiveness measure for the given portion of content within the presentation context comprises generating an effectiveness measure that is proportional to a product of the content likability values for the given portion of content and an engagement rate indicated by the first feedback, wherein the engagement rate is determined independent of a click through rate of the given portion of content.

8. A system, comprising:
a plurality of computers; and
computer-readable media that store computer instructions executable by the plurality of computers, and upon execution cause the plurality of computers to perform operations comprising:
embedding, within a portion of content that is presented in web pages, an in-situ evaluation tool that enables submission of feedback through the in-situ evaluation tool and without redirecting a client device to a different web page or causing a new browser window to be opened;
distributing, to multiple different client devices that present various different web pages, the portion of content that includes the in-situ evaluation tool;
collecting, from each client device among the multiple different client devices, first feedback obtained through interaction with a first interface of the in-situ evaluation tool when the portion of content is presented in a web page at the client device, wherein the first feedback is obtained without redirecting the client device to a different web page than the web page on which the portion of content is presented or causing a new browser window to be opened at the client device in response to the interaction with the first interface of the in-situ evaluation tool; and
adjusting distribution of the portion of content based on the first feedback received from the multiple different client devices through the in-situ evaluation tool.

9. The system of claim 8, wherein the operations comprise:
for each of a plurality of different presentation contexts in which the portion of content is distributed:
generating, based on the first feedback received through the in-situ evaluation tool, recognition values for a given portion of content within the presentation context; and
generating, based on the recognition values for the content within the presentation context, an effectiveness measure for the given portion of content within the presentation context.

10. The system of claim 9, wherein:
generating the effectiveness measure for the given portion of content within the presentation context comprises generating an effectiveness measure that is proportional to a product of the recognition values for the given portion of content and an engagement rate indicated by the first feedback.

11. The system of claim 8, wherein the operations comprise:
for each of a plurality of different presentation contexts in which the portion of content is distributed:
generating, based on the first feedback received through the in-situ evaluation tool, linkage values for a given portion of content within the presentation context; and
generating, based on the linkage values for the content within the presentation context, an effectiveness measure for the given portion of content within the presentation context.

12. The system of claim 11, wherein:
generating the effectiveness measure for the given portion of content within the presentation context comprises generating an effectiveness measure that is proportional to a product of the linkage values for the given portion of content and an engagement rate indicated by the first feedback.

13. The system of claim 8, wherein the operations comprise:
for each of a plurality of different presentation contexts in which the portion of content is distributed:
generating, based on the first feedback received through the in-situ evaluation tool, linkage values for a given portion of content within the presentation context; and
generating, based on the linkage values for the content within the presentation context, an effectiveness measure for the given portion of content within the presentation context.

14. The system of claim 13, wherein:
generating the effectiveness measure for the given portion of content within the presentation context comprises generating an effectiveness measure that is proportional to a product of the content likability values for the given portion of content and an engagement rate indicated by the first feedback, wherein the engagement rate is determined independent of a click through rate of the given portion of content.

15. A non-transitory computer readable storage medium that stores computer instructions that upon execution by one or more computers causes the one or more computers to perform operations comprising:
embedding, within a portion of content that is presented in web pages, an in-situ evaluation tool that enables submission of feedback through the in-situ evaluation tool and without redirecting a client device to a different web page or causing a new browser window to be opened;
distributing, to multiple different client devices that present various different web pages, the portion of content that includes the in-situ evaluation tool;
collecting, from each client device among the multiple different client devices, first feedback obtained through interaction with a first interface of the in-situ evaluation tool when the portion of content is presented in a web page at the client device, wherein the first feedback is obtained without redirecting the client device to a different web page than the web page on which the portion of content is presented or causing a new browser window to be opened at the client device in response to the interaction with the first interface of the in-situ evaluation tool; and
adjusting distribution of the portion of content based on the first feedback received from the multiple different client devices through the in-situ evaluation tool.

16. The computer readable storage medium of claim 15, the operations comprising:
for each of a plurality of different presentation contexts in which the portion of content is distributed:
generating, based on the first feedback received through the in-situ evaluation tool, recognition values for a given portion of content within the presentation context; and
generating, based on the recognition values for the content within the presentation context, an effectiveness measure for the given portion of content within the presentation context.

17. The computer readable storage medium of claim 16, wherein:
generating the effectiveness measure for the given portion of content within the presentation context comprises generating an effectiveness measure that is proportional to a product of the recognition values for the given portion of content and an engagement rate indicated by the first feedback.

18. The computer readable storage medium of claim 15, the operations comprising:
for each of a plurality of different presentation contexts in which the portion of content is distributed:
generating, based on the first feedback received through the in-situ evaluation tool, linkage values for given portion of content within the presentation context; and
generating, based on the linkage values for the given portion of content within the presentation context, an effectiveness measure for the given portion of content within the presentation context.

19. The computer readable storage medium of claim 18, wherein:
generating the effectiveness measure for the given portion of content within the presentation context comprises generating an effectiveness measure that is proportional to a product of the linkage values for the given portion of content and an engagement rate indicated by the first feedback.

20. The computer readable storage medium of claim 15, the operations comprising:
for each of a plurality of different presentation contexts in which the given portion of content is distributed:
generating, based on the first feedback received through the in-situ evaluation tool, content likability values for given portion of content within the presentation context; and
generating, based on the content likability values for the given portion of content within the presentation context, an effectiveness measure for the given portion of content within the presentation context.

* * * * *